US008180388B1

(12) United States Patent
Ghaus et al.

(10) Patent No.: US 8,180,388 B1
(45) Date of Patent: May 15, 2012

(54) METHODS AND SYSTEMS FOR IMPROVING SESSION ESTABLISHMENT WITH WIRELESS COMMUNICATION DEVICES

(75) Inventors: Mohammad Ghaus, Ashburn, VA (US); Pinal Tailor, Falls Church, VA (US); Hetal Mistry, Herndon, VA (US); Ashish Bhan, Shawnee, KS (US); Jason P. Sigg, Olathe, KS (US); Anthony K. Leung, Kansas City, MO (US); Jasinder P. Singh, Olathe, KS (US); Maulik K. Shah, Overland Park, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 701 days.

(21) Appl. No.: 12/332,322

(22) Filed: Dec. 10, 2008

(51) Int. Cl.
*H04M 11/00* (2006.01)
*H04W 4/00* (2009.01)
*H04W 40/00* (2009.01)
*H04B 7/00* (2006.01)
*H04L 12/66* (2006.01)
*H04L 12/28* (2006.01)
*H04L 12/413* (2006.01)
*H04L 12/43* (2006.01)
*H04J 3/24* (2006.01)

(52) U.S. Cl. ........ 455/519; 455/403; 455/434; 455/445; 455/517; 455/518; 709/218; 370/328; 370/329; 370/338; 370/349; 370/352; 370/395.2; 370/445; 370/447; 370/461

(58) Field of Classification Search .................. 455/403, 455/434, 445, 517–519; 370/328–329, 338, 370/349, 352, 395.2, 445, 447, 461; 709/218
See application file for complete search history.

(56) References Cited

U.S. PATENT DOCUMENTS

| | | | |
|---|---|---|---|
| 7,006,530 B2 * | 2/2006 | Spinar et al. | 370/468 |
| 7,089,294 B1 * | 8/2006 | Baskey et al. | 709/219 |
| 7,953,040 B2 * | 5/2011 | Harikumar et al. | 370/329 |
| 7,990,921 B1 * | 8/2011 | Sarkar et al. | 370/329 |
| 8,023,439 B2 * | 9/2011 | Rao | 370/310 |
| 8,032,150 B2 * | 10/2011 | Cole | 455/456.1 |
| 8,060,058 B2 * | 11/2011 | Ch'ng et al. | 455/411 |
| 8,078,165 B2 * | 12/2011 | Mate et al. | 455/432.1 |
| 2003/0012177 A1 | 1/2003 | Vassilovski | |
| 2005/0078627 A1 | 4/2005 | Yoon et al. | |
| 2007/0140252 A1 | 6/2007 | Akhtar et al. | |
| 2007/0168466 A1 * | 7/2007 | Tooley et al. | 709/218 |
| 2007/0238442 A1 | 10/2007 | Mate et al. | |
| 2008/0037463 A1 | 2/2008 | Gopal | |
| 2008/0301166 A1 * | 12/2008 | Sugiyama et al. | 707/102 |
| 2008/0313275 A1 * | 12/2008 | Luo et al. | 709/204 |
| 2009/0164235 A1 * | 6/2009 | Malik | 705/1 |
| 2009/0286510 A1 * | 11/2009 | Huber et al. | 455/410 |
| 2010/0039936 A1 * | 2/2010 | Jin et al. | 370/230 |

(Continued)

*Primary Examiner* — Bobbak Safaipour (57) ABSTRACT

Methods and systems for reducing the latency of instant communication session establishment are presented. According to various preferred embodiments, a RAN, may receive a setup request message via a packet-switched network. The RAN may determine, from a quality of service (QOS) indication contained in the setup request message, that the setup request message is requesting establishment of a instant communication session. The RAN may further determine an intended destination wireless communication device (WCD) for the setup request message. Based on the QOS indication and/or a profile indicating the destination WCD's capabilities, the RAN may pre-allocate resources for the instant communication session in parallel to paging the destination WCD. In this way, the latencies associated with these procedures are overlapped, thus reducing the overall latency of instant communication session establishment.

20 Claims, 8 Drawing Sheets

U.S. PATENT DOCUMENTS

| | | | |
|---|---|---|---|
| 2010/0195503 A1* | 8/2010 | Raleigh | 370/235 |
| 2010/0195563 A1* | 8/2010 | Jong et al. | 370/321 |
| 2010/0309885 A1* | 12/2010 | Matsumoto | 370/332 |
| 2010/0329225 A1* | 12/2010 | Balasubramanian | 370/338 |
| 2011/0249645 A1* | 10/2011 | Spinar et al. | 370/329 |
| 2011/0314145 A1* | 12/2011 | Raleigh et al. | 709/224 |

* cited by examiner

METHODS AND SYSTEMS FOR IMPROVING SESSION ESTABLISHMENT WITH WIRELESS COMMUNICATION DEVICES

BACKGROUND

Instant communication services, popularized by NEXTEL® DIRECT CONNECT® and often referred to as "push to talk," allow a caller to select one or more callees to receive a real-time or near-real-time message from the caller. The message typically comprises a voice signal, such as speech. Instant communication technology has been widely deployed in public safety markets as well as for businesses with distributed, mobile workforces. Public safety markets are exemplified by police, firefighting, and national security services. Distributed, mobile workforces are exemplified by home repair technicians, delivery services, and transportation services, such as taxi or limousine fleets.

Traditional instant communication services are based on circuit-switched technology and facilitate instant communication sessions between one or more mobile devices such as cell phones. A performance metric of these services is the speed at which instant communication sessions can be established. Users of these services expect an experience as rapid as that of a walkie-talkie, and may become frustrated with the instant communication service if it takes longer than a few seconds to establish an instant communication session. Circuit-switched technology can provide a low-latency instant communication service because end-to-end communications circuits can be reserved across the network for the signaling and bearer traffic associated with the service.

As mobile and cellular voice services are migrated to packet-switched networks, instant communication services may be implemented using packet-switching protocols, such as the Internet Protocol (IP). However, IP was initially a best-effort protocol, and in practice it did not provide low-latency service. For example, traditional IP did not allow prioritization of some types of sessions (such as instant communication sessions) over other types of sessions (such as web browsing sessions).

Furthermore, packet-switched wireless data infrastructure components are designed for maximizing session throughput rather than minimizing session establishment latency. Thus, these traditional components are poorly equipped to provide low-latency instant communication services using IP.

Additionally, some wireless technologies release all air interface traffic channels used by a wireless communication device if the wireless communication device does not use these channels for a given period of time (usually 10-30 seconds). A wireless communication device without any allocated traffic channels is considered to be dormant, and several seconds may be needed to "wake up" such a dormant wireless communication device. Thus, dormancy adds even more potential delay to instant communication session establishment latency.

Accordingly, it is desirable to develop new methods and systems that facilitate rapid establishment of instant communication sessions over wireless, IP-based networks.

OVERVIEW

Methods and systems to reduce the latency of instant communication services are presented. These methods and systems involve a radio access network (RAN) that facilitates establishment of an instant communication session for a destination wireless communication device (WCD). Preferably, the RAN is communicatively coupled to a packet-switched network, and provides a wireless coverage area that serves the destination WCD. Thus, via the packet-switched network and the RAN, a caller device can initiate an instant communication session to the destination WCD.

Normally, upon receiving a packet for a dormant destination WCD, the RAN would transmit a page request to the destination WCD, and wait up to several seconds for the destination WCD to respond to the page request (e.g., with a connection request). The RAN would then allocate any required resources, such as a traffic channel, for the resulting communication session.

According to the embodiments herein, the RAN preferably reduces the end-to-end latency of session establishment for instant communication sessions by overlapping the latency associated with paging the destination WCD with latency associated with allocating the resources for the destination WCD. Upon receiving the packet for the destination WCD, the RAN preferably identifies the packet to be an instant communication session setup message and determines that the destination WCD supports instant communication sessions. To do so, the RAN may examine the packet for an appropriate QOS indication contained in the packet, and/or read a stored profile associated with the destination WCD to determine that the destination WCD is capable of instant communication sessions. The RAN may transmit a page request message to the destination WCD, and pre-allocate the resources for communication session with the destination WCD before the destination WCD responds to page request from the RAN. This allows the RAN to overlap (1) the latency between transmitting the page request and receiving the connection request with (2) the latency required to acquire the resources. Thus, the overall latency of instant communication session setup may be reduced.

Accordingly, in a first embodiment, the RAN receives and stores a profile from the destination WCD. Alternatively, the profile may already be stored. The profile may indicate that the destination WCD is capable of supporting an instant communication session. At a later point in time, the RAN may receive an instant communication session setup message via the packet-switched network. Preferably, the instant communication session setup message contains a quality of service (QOS) indication. For example, the instant communication session setup message may be an IP packet with a differentiated services code point value indicative of a particular QOS.

The RAN may then determine whether the QOS indication contains a pre-determined QOS value (e.g., representing a low latency service), and the destination WCD is capable of supporting the instant communication session. If the RAN determines that this is the case, then the RAN preferably transmits a page request message to the destination WCD, pre-allocates at least one QOS resource for the instant communication session, transmits an indication of the pre-allocated QOS resource(s) to the destination WCD, and thereafter receives a connection request message from the destination WCD. If the RAN determines that this is not the case, then the RAN transmits the page request message to the destination WCD, and receives the connection request message from the destination WCD without having previously performed QOS resource pre-allocation for the instant communication session. In this way, resources are pre-allocated only when the RAN has reason to understand that a low-latency session, such as an instant communication session, is being established.

In a second embodiment, the RAN receives, via the packet-switched network, a setup request seeking to establish an instant communication session with the destination WCD. The setup request may contain a quality of service (QOS)

indication. In response to receiving the setup request, the RAN preferably transmits a page request message to the destination WCD.

The RAN then makes a determination of whether the QOS indication contained in the setup request matches a pre-determined QOS value (e.g., representing a low latency service). If the determination is that this is the case, then the RAN assigns a traffic channel for the instant communication session to the destination WCD, and assigns at least one QOS resource for the instant communication session, without first receiving a connection request message from the WCD. Thereafter, the RAN receives a connection request message from the destination WCD, the connection request message responding to the page request message. If determination is that this is not the case, then the RAN receives the connection request message from the destination WCD, and thereafter assigns the traffic channel for the instant communication session to the destination WCD. In this way, session establishment latency for instant communication sessions is effectively reduced.

Instant communication services according to these methods and systems are not limited to wireless networks, mobile or cellular destination devices, or delivery of voice messages. Instant communication services may be deployed over wireless or wireline networks, between any combination of fixed, mobile, or portable client devices, and may facilitate the delivery of voice, music, video, still images, streaming media, as well as other forms of content.

These and other aspects and advantages will become apparent to those of ordinary skill in the art by reading the following detailed description, with reference where appropriate to the accompanying drawings. Further, it should be understood that the foregoing overview is merely exemplary and is not intended to limit the scope of the invention as claimed.

DESCRIPTION

In accordance with exemplary embodiments, methods and systems for improving session establishment with wireless communication devices (WCDs) are presented. Preferably, the latency associated with establishing an instant communication session to a destination WCD is reduced by overlapping existing latencies associated with paging the destination WCD and allocating resources for the destination WCD.

I. System Architecture

Figure 1:
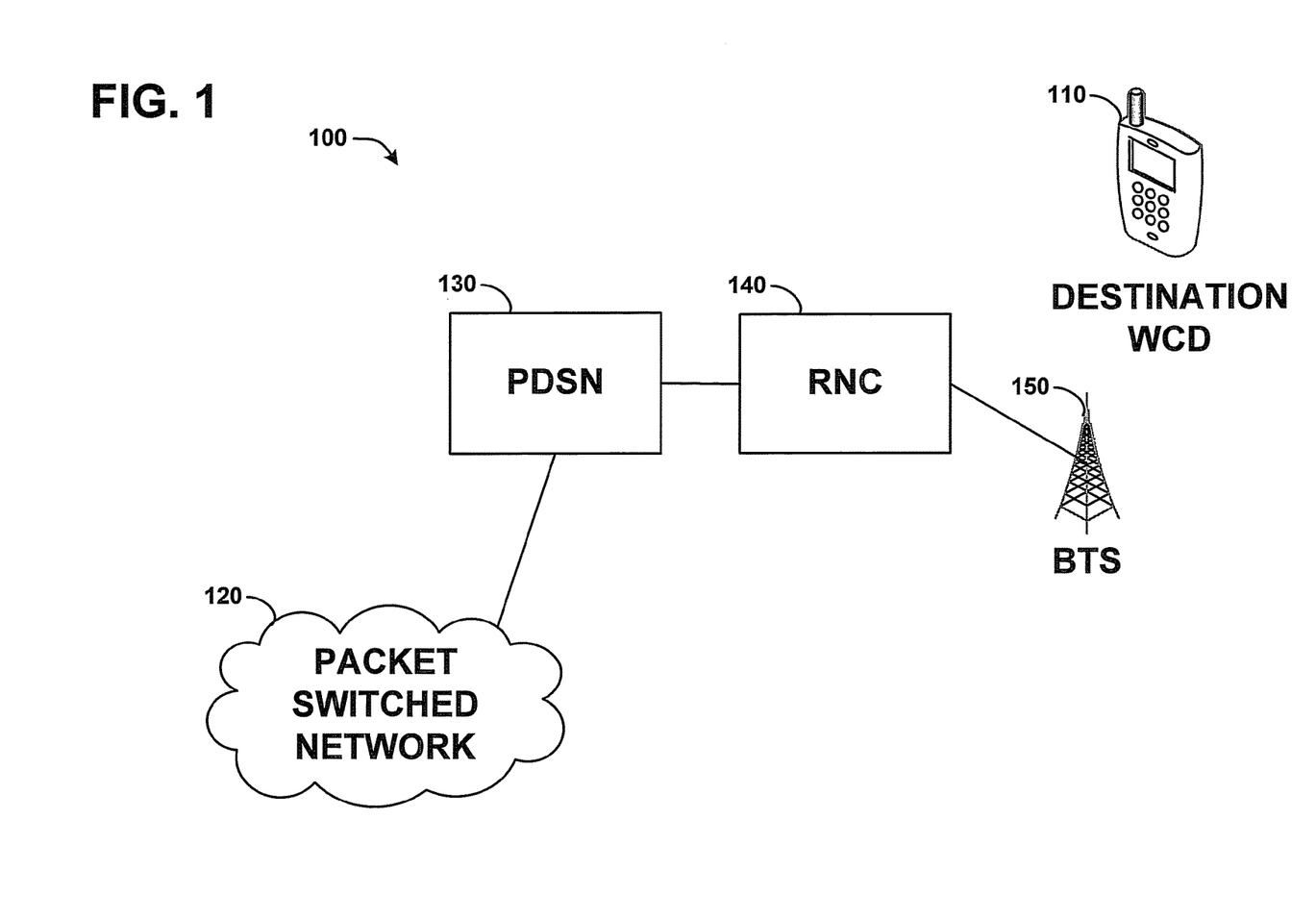
FIG. 1 depicts a communication system in accordance with exemplary embodiments.

FIG. 1 is a simplified block diagram of an exemplary communication network 100, in which exemplary embodiments may be employed. Network 100 includes WCD 110, packet-switched network 120, packet-data serving node (PDSN) 130, radio network controller (RNC) 140, and base transceiver system (BTS) 150. Preferably, these components are communicatively coupled as shown in FIG. 1, but other communicative couplings and arrangements of these or other components may be used.

The combination of network elements including RNC 140 and BTS 150 may be collectively referred to as a radio access network (RAN). However, PDSN 150 may be co-located with the RAN or combined into components of the RAN. Furthermore, the elements of the RAN itself may be combined together or separated into more logically distinct or physically distinct components than shown in FIG. 1. For example, PDSN 130, BTS 150, or both may be combined into RNC 140.

Regardless of the exact configuration of the elements in FIG. 1, a general purpose of these elements is to allow WCD 110 to participate in packet-switched communications. WCD 110 may also be capable of participating in circuit-switched calls, such as traditional voice telephony services. However, these circuit-switched calls will preferably also use components not shown in FIG. 1, such as a mobile switching center (MSC). Packet-switched calls, also known as data calls, enable multi-media services, such as voice over IP, video over IP, instant communication (push-to-talk), audio and video streaming, web surfing, and various other types of services. These calls typically traverse packet-switched network 120 and may be routed on to either the Internet, a private IP network, or both.

For purposes of simplicity, FIG. 1 depicts network 100 as only containing one of each of WCD 110, packet-switched network 120, PDSN 130, RNC 140, and BTS 150. However, network 100 may contain more than one of any of these components. For instance, BTS 150 may serve multiple WCDs, RNC 140 may support multiple BTSs, and so on.

Furthermore, the components of network 100 may operate in accordance to various types of wireless protocols, such as Code Division Multiple Access (CDMA), Worldwide Interoperability for Microwave Access (WIMAX), Universal Mobile Telecommunications System (UMTS), Long Term Evolution (LTE), 802.11 (Wifi), or other protocols now known or later developed.

The characteristics and functions of each of these elements are described at a high level in the following subsections. However, the descriptions in these subsections are merely introductory and should not be interpreted to limit the characteristics and functions of these elements.

a. PDSN

PDSN 130 may be a router-like device that manages the connectivity of WCDs to a packet-switched network. PDSN 130 preferably serves tens, hundreds or thousands of WCDs via point to point protocol (PPP) links to each WCD. However, a PPP link to a WCD is not required for PDSN 130 to serve a WCD. PDSN 130 may also authenticate WCDs, or, in conjunction with an authentication, authorization, and accounting (AAA) server (not shown), facilitate authentication of WCDs. Once a WCD is authenticated, PDSN 130 may grant the WCD access to packet-switched network 120.

PDSN 130 may directly route WCD traffic to and from packet-switched network 120, and/or may serve as a mobile IP foreign agent, and route traffic to and from these packet-switched networks through a home agent (not shown). If PDSN 130 directly routes WCD traffic to and from a packet-switched network, then preferably the PDSN 130 performs typical remote access functions (RAS), such as assigning a home IP address, next-hop gateway IP address, and domain name system (DNS) server IP addresses to each WCD that PDSN 130 serves. If PDSN 130 instead serves as a foreign agent, then a home agent may perform some, or all, of these remote access functions. However, PDSN 130 may perform RAS and foreign agent functions simultaneously.

b. RNC

RNC 140 may control one or more BTSs. In particular, RNC 140 may determine how each BTS manages the WCDs 110 in the BTS's wireless coverage areas and the resources of these wireless coverage areas. For example, a BSC may instruct a BTS to assign wireless signaling or traffic channels to a WCD, increase or decrease power on these channels to the WCD, or hand off the WCD to a different BTS. Data traffic, including voice, video, and multimedia services over IP, to and from each WCD, flows through an RNC. RNC 140 may additionally include or have access to a stored profile associated with each WCD that it is serving at any time, and these profiles may be updated periodically.

c. BTS

BTS 150 radiates to define one or more wireless coverage areas. Each wireless coverage area may provide air interface access to WCD 110 and any other WCDs served by the wireless coverage area. The air interface a wireless coverage areas may include forward links for transmitting information from a BTS to a WCD (in the forward direction) and reverse links for transmitting information from a WCD to a BTS (in the reverse direction). Through the forward and reverse links, a BTS and a WCD may exchange signaling traffic, as well as bearer traffic, such as voice, data, video, or other media.

d. WCD

A WCD in system 100, such as WCD 110, could be a wireless telephone, a wireless personal digital assistant, a wirelessly equipped laptop computer, a wireless router, or another type of mobile or fixed wireless device. Preferably, a WCD is a subscriber device, which is manipulated by a human in order to establish circuit-switched or packet-switched voice and/or data calls. However a WCD could also be an automated device without a human interface.

Typically, a WCD is associated with one or more BTSs at a time and uses the wireless coverage areas of these BTSs to communicate with correspondent nodes, such as web servers, gaming servers, short message service (SMS) servers, voice over IP (VoIP) signaling proxies, VoIP bearer gateways, and other WCDs. A WCD may also be able to transfer ongoing communication sessions from one BTS to another in a hand-off process.

A WCD preferably supports multiple applications, implemented in software, firmware or hardware, that execute on the WCD. These applications may include an instant communication application.

Instant communication services are similar to that of a walkie-talkie. For instance, a first instant communication service user may send a voice message to a second instant communication service user. This message may be delivered in real-time or near-real-time, not unlike a message delivered by an instant messaging application. Preferably the first instant communication service user's WCD provides a means for the first instant communication service user to select the second instant communication service user. Typically, this means takes the form of a buddy list. The first instant communication service user populates his or her buddy list with the names, phone numbers, and/or user-ids of the individuals with which he or she wishes to conduct instant communication sessions. Then, the first instant communication service user can select the second instant communication service user from the buddy list. Preferably, upon selecting the second instant communication service user, the first instant communication service user is prompted to record a voice message. This voice message may be long or short, and may either be stored in the first instant communication service user's WCD and then forwarded toward the second instant communication service user's WCD.

Alternatively, the voice message may be recorded and streamed in real-time to the second instant communication service user's WCD. For instance, the first instant communication service user's WCD may simultaneously record the first instant communication service user's voice message while transmitting (streaming) packets of portions of the voice message that are already recorded. Thus, it is possible for the first instant communication service user's WCD to transmit portions of the voice message before the first instant communication service user has completed recording the voice message. Some strategies for performing these aspects of this invention are described in U.S. Pat. No. 7,043,266, which is herein incorporated by reference in its entirety.

Upon receiving the voice message or, if the voice message is streamed, the beginning of the voice message, the second instant communication service user's WCD preferably begins to play out the voice message so that the second instant communication service user can hear it. Alternatively, the second instant communication service user's WCD may alert or prompt the second instant communication service user that a voice message has arrived. Accordingly, the second instant communication service user may choose to accept the voice message, deny the voice message, or store the voice message for later retrieval.

Instant communication services may be facilitated by an instant communication server that is located topologically between the first and second instant communication service users. Such an instant communication server preferably performs message switching functions between instant communication service users. Thus, the first instant communication service user would transmit an instant communication message to the instant communication server, and the instant communication server would re-transmit that message to the second instant communication service user.

Furthermore, instant communication sessions may involve more than two users, with each user in a session transmitting (either directly or via an instant communication server) instant communication messages to multiple recipients. Moreover, instant communication services may involve media other than voice being transmitted from one device to another. Other types of media, including, text, video, still images, or computer files may be transmitted instead.

II. Dormancy and Paging of Dormant WCDs

A goal of instant communication services is to facilitate the rapid delivery of messages from originating device to destination device. While this end-to-end delivery may not be "instant" it is desirable for the delivery to take less than, for instance, a number of seconds. However, if a destination WCD is in a dormant mode, a second or more may be required for the RAN to wake up the dormant destination WCD. Thus, achieving this goal is challenging in practice.

Some wireless technologies, such as CDMA2000® utilize a dormant mode to conserve both wireless resources (e.g., traffic channels) and WCD battery life. A dormant WCD is not already involved in an ongoing communication session. Thus, there are no traffic channels assigned to a dormant WCD. In contrast, an active WCD is either engaging in a circuit-switched or packet-switched voice call, data session, or otherwise involved in an ongoing communication. Usually, one or more traffic channels are assigned to an active WCD.

Since a dormant WCD does not have an assigned traffic channel, when the RAN receives packet data for the WCD, the RAN cannot immediately transmit this packet data to the WCD. Instead the RAN must first page the WCD, and then assign a traffic channel to the WCD. Typically, an RAN pages a WCD by transmitting page request messages on a paging channel. The paging channel is an air interface channel used for paging functions, and is associated with the carrier frequency of its wireless coverage area. The RAN may support one or more paging channels per wireless coverage area. Each paging channel may be divided, via time division multiplexing, into a number of time slots, in some of which the RAN can transmit a page request message to a particular WCD.

A WCD preferably conserves battery power by listening to the paging channel only during specific time slots. A given "slot cycle index" (SCI) defines the time slots at which the WCD will check the paging channel for a page request message. For instance, under CDMA2000®, a WCD operating at slot cycle index 0 (zero) would listen for a page request message every 1.28 seconds, a WCD operating at slot cycle index 1 would listen for a page request message every 2.56 seconds, a WCD operating at slot cycle index 2 would listen for a page request message every 5.12 seconds, and so on. The SCI of a particular WCD is typically configured in WCD's serving the RNC or BTS, but may be overridden by the WCD, or may be negotiated between the WCD and these RAN components. Furthermore, the SCI may take on values less than 0 (zero) and greater than 2.

When the WCD receives a page request message, it will normally respond to the RAN with a connection request message. Under CDMA2000®, a WCD preferably transmits the connection request message to the RAN on an access channel, which may be another type of signal channel supported by the air interface. After the RAN receives the connection request message from the WCD, the RAN preferably affirms the receipt of the page response message by transmitting a base station acknowledgement message to the WCD on the paging channel.

For purposes of example, consider the case of an incoming packet-switched voice call. To notify a dormant WCD of the incoming call, the RAN may page the WCD. The WCD receives the page, then typically indicates to its user that they are being called (i.e., the WCD will "ring"). Once this paging procedure has completed, the WCD is no longer dormant. Instead, it is considered to be active and may partake in the exchange of bearer traffic with the RAN. Accordingly, the RAN may allocate one or more traffic channels for the WCD to use for voice and/or data communication.

III. Exemplary Operation

While paging a dormant destination WCD may work reasonably well for best effort services, such as web browsing and email, the latency associated with the WCD responding to a page request message and the RNC assigning the WCD a traffic channel may exceed the end to end latency budget of instant communication services. Thus, one aspect of the methods and systems herein is to reduce the latency associated with paging a destination WCD and assigning a traffic channel to the destination WCD by overlapping these activities.

For instance, an RNC may receive packet data for a destination WCD, determine that the destination WCD is dormant, transmit a page request message to the destination WCD, but allocate a traffic channel before the destination WCD responds to the page request message. In this way, the latency associated with allocating the traffic channel occurs in parallel to the paging latency, thus reducing the overall latency.

However, it would be inefficient for the RNC to perform this traffic channel pre-allocation for all instances of incoming packet data for a WCD. If the incoming packet data is associated with a best effort session and not with an instant communication service, then it may be unnecessary to reduce latency in this manner. Furthermore, the destination WCD may not respond to the page request message, as it may have been turned off or out of range. In such a situation, traffic channels are unnecessarily pre-allocated. While these pre-allocated traffic channels are being held by the RNC, they cannot be assigned to other WCDs.

Thus, it is advantageous for the RNC to perform traffic channel pre-allocation only when the incoming packet data is associated with an instant communication service. Alternatively, or additionally, it would also be advantageous for the RNC to perform traffic channel pre-allocation only when the destination WCD has indicated that it supports instant communication services. Finally, in addition to pre-allocating a traffic channel for a destination WCD, it may be desirable for the RNC to also pre-allocate quality of service (QOS) resources for the instant communication session. Thus, the packets associated with the instant communication session can be processed and forwarded by the RNC and/or BTS in a more expeditious fashion than packets associated with best-effort services, consequently furthering the goal of providing a low-latency service.

Figure 2:
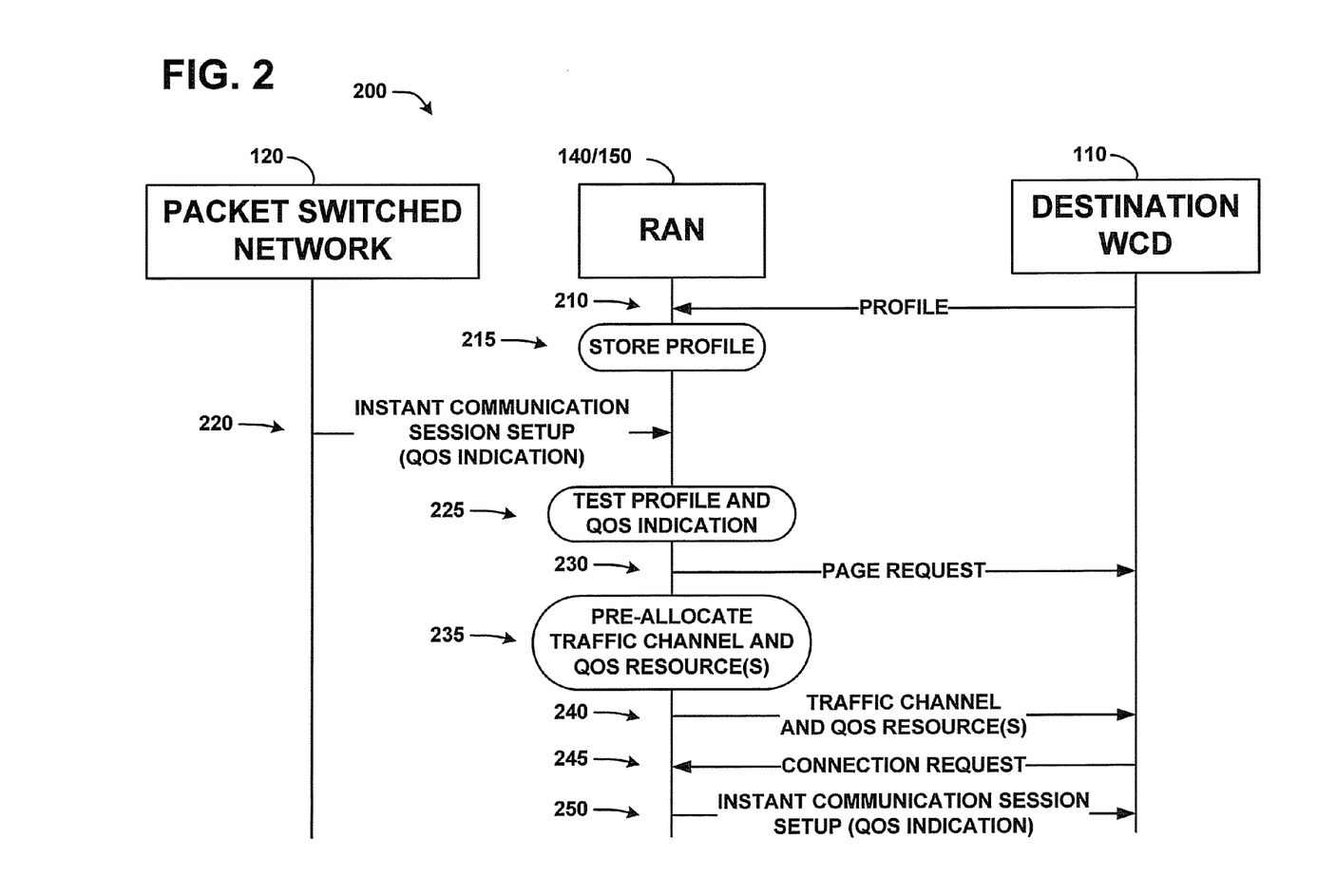
FIG. 2 depicts a call flow in accordance with an exemplary embodiment.

Accordingly, FIG. 2 depicts call flow 200 illustrating traffic channel and QOS resource pre-allocation. At step 210, destination WCD 110 transmits a profile to RAN 140/150. (Here, RNC 140 and BTS 150 are viewed as a single component, RAN 140/150, because the functions carried out by this single component could occur at either RNC 140 or BTS 150.) WCD 110 may transmit this profile each time that WCD 110 registers with RAN 140/150. Alternatively, WCD 110 may transmit the profile upon any change to the profile on the WCD or periodically. The profile preferably contains an indication that destination WCD 110 supports the instant communication service, or is capable of supporting the instant communication service. The profile may also contain indications of other capabilities of destination WCD 110. At step 215, RAN 140/150 stores the profile in memory.

At step 220, an instant communication setup message arrives at RAN 140/150. Preferably, this instant communication setup message is transmitted by either an originating device, such as an originating WCD, or by an instant communication server on behalf of an originating device. The intended recipient of the instant communication setup message is the destination WCD.

While the instant communication setup message can take various forms, preferably it is an IP packet containing protocols that adhere to the Transport Control Protocol/Internet Protocol (TCP/IP) suite. Accordingly, the instant communication setup message may contain an IP header, a User Datagram Protocol (UDP) header and a Session Initiation Protocol (SIP) payload. Alternatively, the UDP header could be replaced with a TCP header or the header of another transport layer protocol. Additionally, the SIP payload could be replaced with an H.323 payload, or a payload of another session establishment protocol. Furthermore, the IP packet may use either IP version 4 (IPv4) or IP version 6 (IPv6).

IP is defined by the Internet Engineering Task Force (IETF) Request for Comments (RFC) 791, TCP is defined by IETF RFC 793, UDP is defined by IETF RFC 768, SIP is defined by IETF RFC 3261, and IPv6 is defined by IETF RFC 2460. Accordingly, these RFCs are incorporated by reference in their entirety herein. Additionally, H.323 is defined in the International Telecommunications Union (ITU) Recommendation H.323, and is also incorporated by reference in its entirety herein.

Preferably, the IP packet, regardless of whether it is an IPv4 or IPv6 packet, contains a QOS indication. Such a QOS indication may adhere to a differentiated services standard. An exemplary differentiated services standard is defined by IETF RFC 2474 and is incorporated by reference in their entirety herein. The QOS indication may comprise a differentiated services code point (DSCP) appearing in the IP header. The DSCP preferably contains a value designating a desired treatment of the packet. Typically a DSCP consists of one or more bits in a pattern that can be interpreted to specify a forwarding preference and/or a drop preference. For instance, assuming for the moment that the DSCP consists of six bits, the pattern 001010 may indicate the highest level of forwarding preference (resulting in a lower latency service), while the pattern 000000 may indicate a best effort service (resulting in a higher latency service).

Accordingly, when a router, switch, firewall, or another network component receives an IP packet, the router may examine the packet's DSCP, and apply an appropriate forwarding policy to the packet. For example, the router may implement different egress queues for each DSCP value. Thus, the router may place packets with a DSCP of 001010 in a high priority queue, and place packets with a DSCP of 000000 in a low priority queue. Then, the router may forward packets in higher priority queues before serving packets in lower priority queues. Thus, packets with a DSCP indicative of a higher forwarding preference are likely to experience a lower end to end latency as these packets traverse routers, switches, firewalls, and other network components.

Thus, by marking IP packets that contain instant communication session setup requests with an appropriate DSCP, these IP packets may receive a low-latency service that is desirable for instant communication services. Furthermore, by using a DSCP that is indicative of instant communication services, an instant communication session setup request can be identified by a RAN 140/150 from its DSCP marking. Other types of QOS indications can be used as well.

Accordingly, at step 225, RAN 140/150 reads the QOS indication and the intended destination in the instant communication session setup request, then tests for the condition that: (1) the QOS indication matches a pre-determined QOS value representative of a latency-sensitive service, such as an instant communication service, and (2) the stored profile of the intended destination WCD (in this case destination WCD 110) indicates that the intended destination WCD is capable of supporting an instant communication session.

If the outcome of the test is that the condition is met, then at step 230, RAN 140/150 transmits a page request message to destination WCD 110, in order to initiate bringing destination WCD 110 out of dormancy. Furthermore, at step 235, RAN 140/150 pre-allocates a traffic channel and QOS resources for an instant communication session to destination WCD 110. Preferably the traffic channel allocation consists of at least a forward traffic channel enabling the instant communication session setup request to be delivered to destination WCD 110. However, the traffic channel allocation may also include a reverse traffic channel to support communication from destination WCD 110 to RAN 140/150.

The QOS resources preferably comprise one or more reservation flows for the instant communication session. These reservation flows may be derived from the instant communication session setup request, and may identify the various network and transport layer packet flows that the instant communication session will utilize. For example, an instant communication service may utilize three types of flows: session setup signaling, in-session signaling, and media. Session setup signaling preferably consists of the instant communication session setup request and any other signaling requests to establish an instant communication session. In-session signaling preferably consists of signaling messages transmitted to or from various participants in the instant communications session. These in-session signaling messages may include requests for floor control or for the addition or removal of participants from the session. Media preferably consists of the actual text, voice, video, still images, and other types of content that is transmitted between participants.

Each of these types of flows may utilize different combinations of source and destination IP addresses and/or source and destination TCP or UDP port numbers. Preferably, theses flows are specified in the instant communication session setup message. Thus, RAN 140/150 can transmit specifications of these flows as QOS resources to destination WCD 110, PDSN 130, and/or other network components. RAN 140/150 and these network components can then reserve capacity for the flows, thus further enabling low-latency instant communication services.

Preferably these flows are specified according to the resource reservation protocol (RSVP), which is standardized in IETF RFC 2205. RFC 2205 is herein incorporated by reference in its entirety. However, the flows and QOS resources could be specified according to other means as well.

Regardless of the exact form of the QOS resources, at step 240, RAN 140/150 preferably transmits an indication of the allocated traffic channel and one or more QOS resources to destination WCD 110. At step 245, destination WCD 110 responds to the page request message of step 230 with a connection request message. Upon receiving the connection request message, RAN 140/150, at step 250, transmits the instant communication session setup message to destination WCD 110 on the pre-allocated traffic channel and according to an appropriate QOS treatment.

Figure 3A:
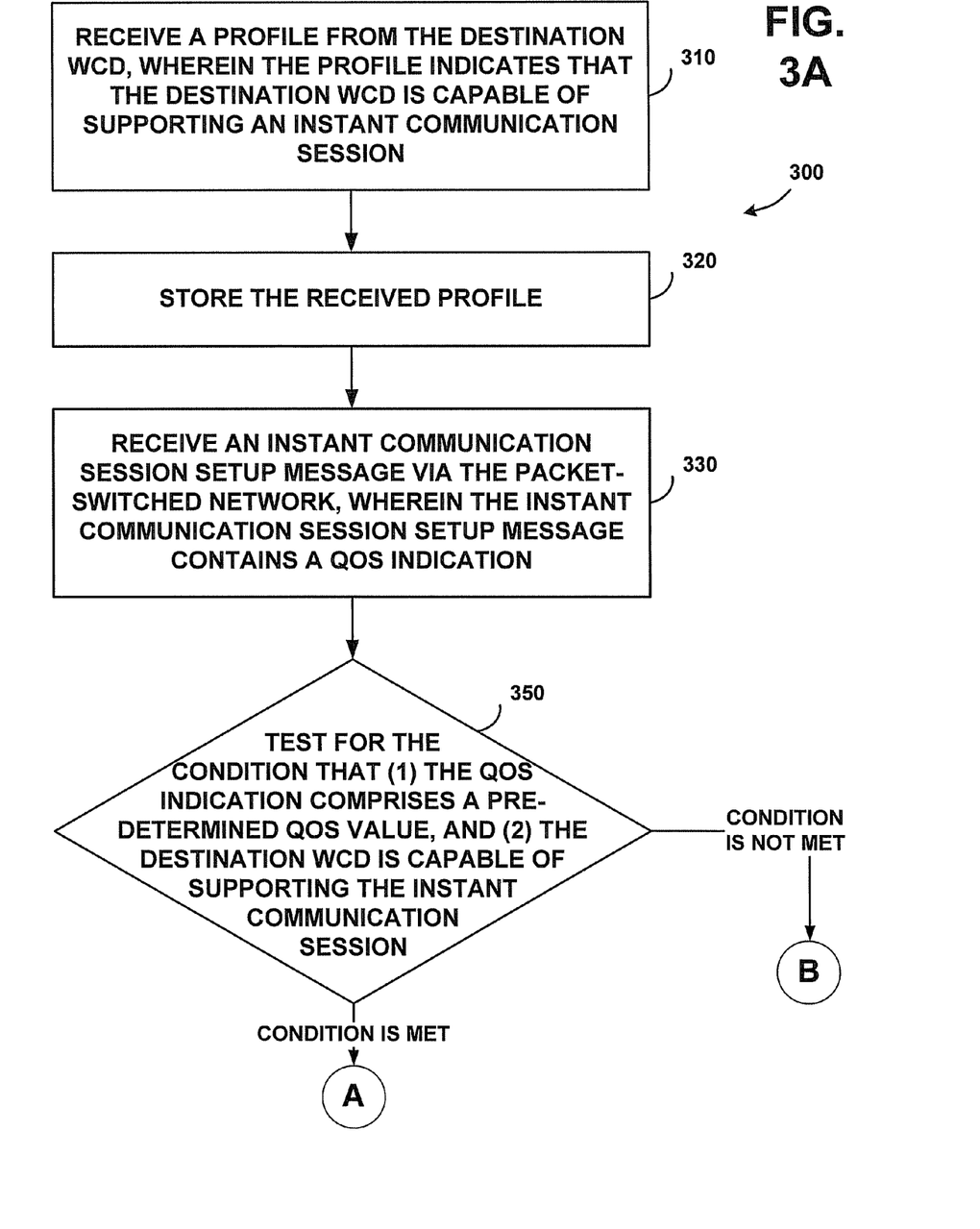
FIGS. 3A and 3B depict a flow chart of a method in accordance with an exemplary embodiment.
Figure 3B:
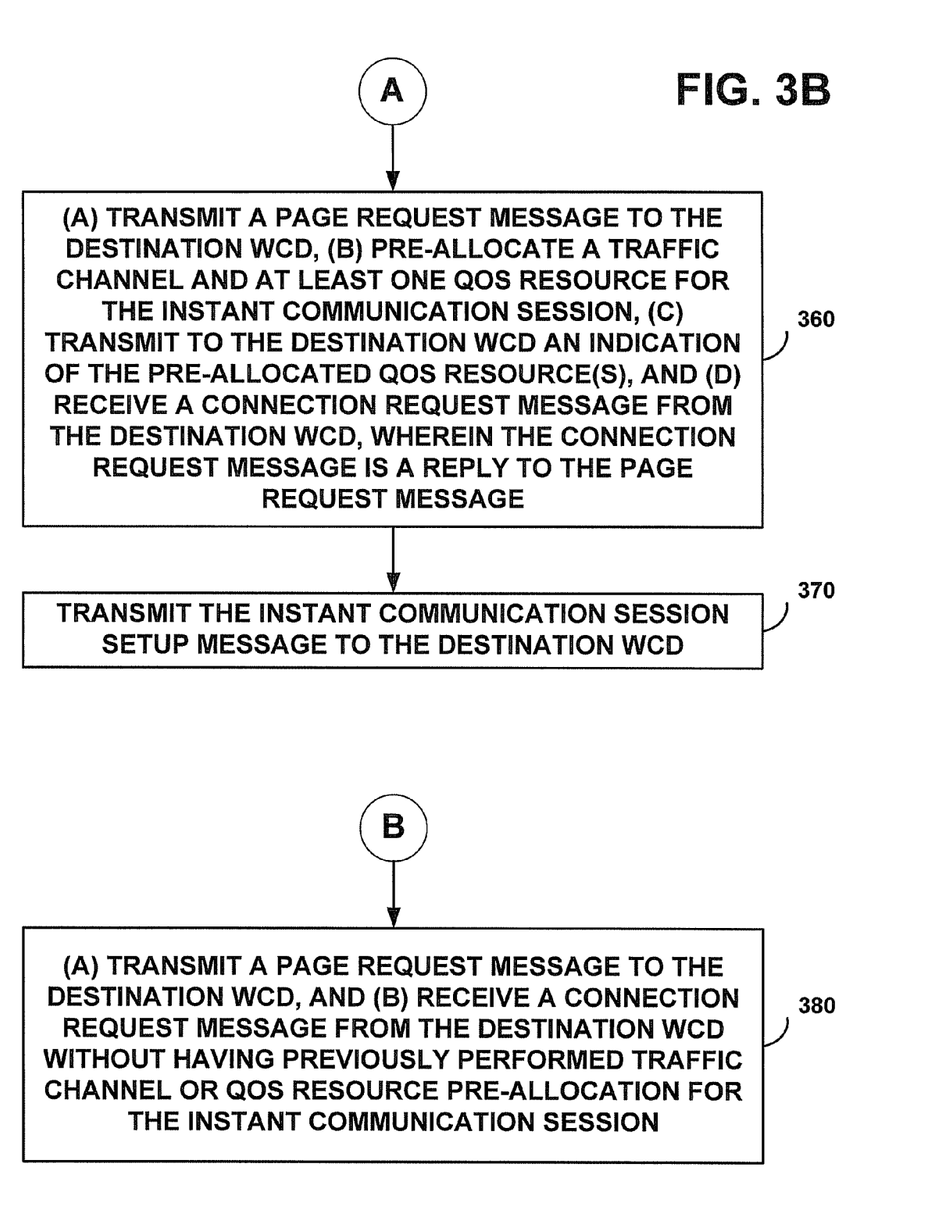

Similarly, FIGS. 3A and 3B depict method 300 of traffic channel and QOS resource pre-allocation. At step 310, a profile indicating that a destination WCD is capable of supporting an instant communication session is received. At step 320, the received profile is stored. Preferably the profile contains an indication that the destination WCD supports an instant communication service, or is capable of supporting an instant communication service. The profile may contain indications of other capabilities of the destination WCD.

At step 330, an instant communication setup message containing a QOS indication is received via a packet-switched network. Preferably the QOS indication includes a DSCP value indicative of a low-latency service, but, alternatively, the QOS indication take other forms. At step 350, the condition that (1) the QOS indication comprises a pre-determined QOS value, and (2) the destination WCD is capable of supporting an instant communication session is tested. The pre-determined QOS value is preferably indicative of a low-latency service. The determination of whether the destination WCD is capable of supporting an instant communication session can be made based on reading the destination WCD's stored profile.

If the outcome of the test is that the condition is met, then at step 360, the following steps are performed: (a) a page request message is transmitted to the destination WCD, (b) a traffic channel and at least one QOS resource is pre-allocated for an instant communication session with the destination WCD, (c) an indication of the pre-allocated traffic channel and at least one QOS resource is transmitted to the destination WCD, and (d) a connection request message responding to the page request message is received from the destination WCD. Note that steps (a) and (b) may occur in any order, and steps (c) and (d) can occur in any order. The at least one QOS resource may take the form of reservations for signaling and/or media flows associated with the instant communication session. At step 370, the instant communication session setup message is transmitted to the destination WCD.

Step 360 may also involve the applying the QOS treatment specified by the QOS indication in the instant communication setup message. The instant communication setup message may be transmitted according to the level of service designated in the QOS indication. For instance, this may involve the instant communication setup message being transmitted in an expedited fashion and/or given preference over other packets that are queued for transmission.

If the outcome of the test is that the condition is not met, then traffic channel and QOS resource pre-allocation are preferably not performed. Accordingly, at step 380, (a) a page request message is transmitted to the destination WCD, and (b) a connection request message responding to the page request message is received from the destination WCD, without traffic channel or QOS resource pre-allocation being performed between these sub-steps of step 380. A traffic channel and possibly one or more QOS resources may then be allocated for the instant communication session. In this way, the instant communication session setup request may be delivered to the destination WCD over the allocated traffic channel, but likely in a less expeditious fashion than if the traffic channel were pre-allocated and the QOS treatment specified in the QOS indication being applied.

Call flow 200 and method 300 provide means for reducing the latency associated with establishment of instant communication sessions. However, alternate embodiments are possible. One such alternative embodiment is depicted as call flow 400 in FIG. 4.

Figure 4:
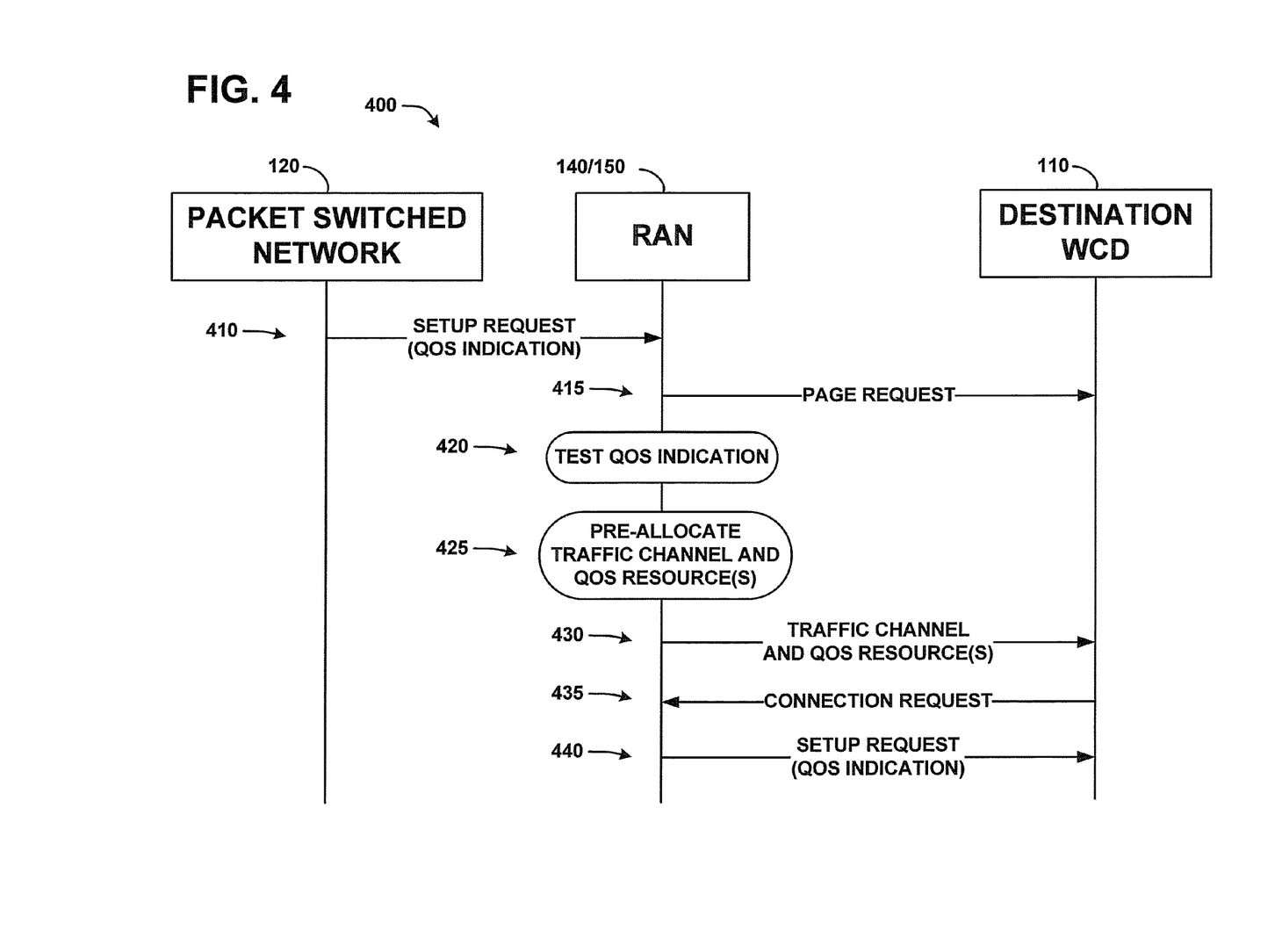
FIG. 4 depicts another call flow in accordance with an exemplary embodiment.

At step 410, RAN 140/150 receives a setup request via packet-switched network 120. The setup request is preferably an instant communication setup request and may contain a QOS indication. The QOS indication can take the form of a DSCP marking that specifies a low-latency service, or the QOS indication may take other forms. At step 415, RAN 140/150 transmits a page request message to destination WCD 110 in order to initiate bringing destination WCD 110 out of dormancy.

At step 420, the QOS indication is tested. In particular, whether the QOS indication contained in the setup request matches a pre-determined QOS value is determined. Preferably, the pre-determined QOS value is indicative of a low-latency service.

If the outcome of the test is that the QOS indication contained in the setup request matches the pre-determined QOS value, then at step 235, RAN 140/150 assigns a traffic channel and QOS resources for an instant communication session to destination WCD 110. Preferably the traffic channel assignment consists of at least a forward traffic channel enabling the instant communication session setup request to be delivered to destination WCD 110. However, the traffic channel assignment may also include a reverse traffic channel to support communication from destination WCD 110 to RAN 140/150.

The QOS resources preferably comprise reservation flows for the instant communication session. These reservation flows may be derived from the instant communication session setup request, and may identify the various network and transport layer packet flows that the instant communication session will utilize.

At step 430, RAN 140/150 transmits an indication of the assigned traffic channel and QOS resources to destination WCD 110. The QOS resources may be encoded according to an RSVP specification, or according to another protocol or format. At step 435, destination WCD 110 responds to the page request message of step 415 with a connection request message. Upon receiving the connection request message, RAN 140/150, at step 440, transmits the instant communication session setup message to destination WCD 110 on the pre-allocated traffic channel and according to an appropriate QOS treatment.

Figure 5A:
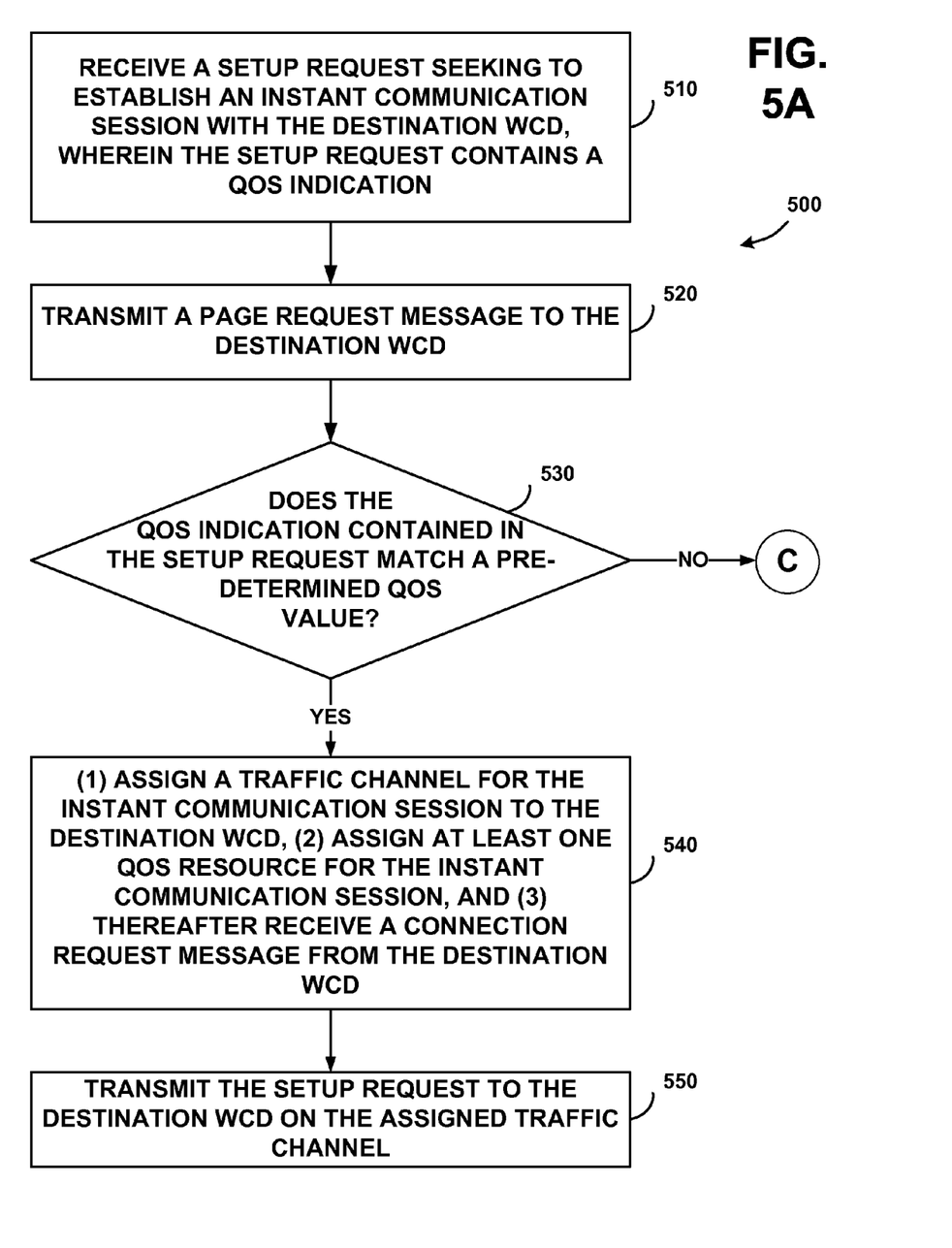
FIGS. 5A and 5B depict another flow chart of a method in accordance with an exemplary embodiment.
Figure 5B:
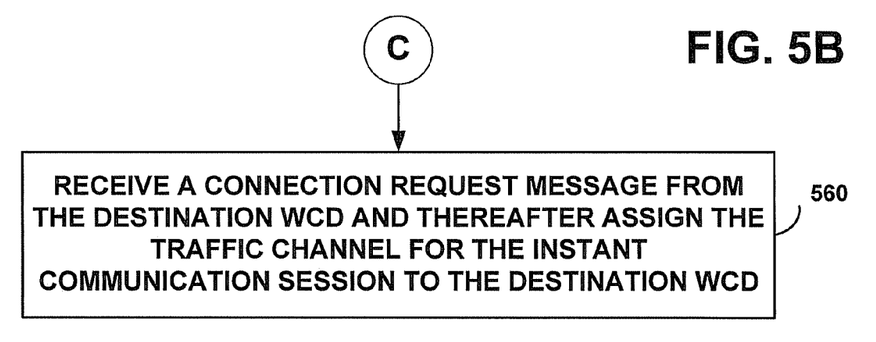

Similarly, FIGS. 5A and 5B depict method 500 illustrating traffic channel and QOS resource assignment. At step 510, a setup request seeking to establish an instant communication session with a destination WCD is received. Preferably, the setup request contains a QOS indication. At step 520, a page request message is transmitted to the destination WCD.

At step 530, the QOS indication in the setup request is compared to a pre-determined QOS value. Preferably, the pre-determined QOS value is indicative of a low-latency service. If the result of the comparison is that these values match, then at step 540 (1) a traffic channel is assigned to the destination WCD for an instant communication session, (2) at least one QOS resource is assigned for the instant communication session, and after these sub-steps, a connection request message is received from the destination WCD. Additionally, at step 550, the setup request message is transmitted to the destination WCD on the assigned traffic channel.

Preferably, the traffic channel assignment consists of at least a forward traffic channel enabling the instant communication session setup request to be delivered to destination WCD 110. However, the traffic channel assignment may also include a reverse traffic channel to support communication from destination WCD 110 to RAN 140/150. The QOS resources preferably comprise reservation flows for the instant communication session. The connection request message is preferably transmitted in response to the page request message that was transmitted in step 520. Furthermore, an indication of the assigned traffic channel and QOS resources may be transmitted to destination WCD 110.

The reservation flows may be derived from the instant communication session setup request, and may identify the various network and transport layer packet flows that the instant communication session will utilize. The reservation flows may be specified using RSVP or some other format or protocol.

If the result of the comparison is that these values do not match, then, at step 560, a connection request message is received from the destination WCD and thereafter a traffic channel is assigned for the instant communication session with the destination WCD.

A variation of this embodiment may include, before receiving the instant communication session setup message, receiving a profile from the destination WCD. The profile may indicate that the destination WCD is capable of supporting the instant communication session. The received profile is then stored. When the traffic channel and/or the at least one QOS resource is assigned, the stored profile may be read, and from this profile a determination may be made that that the destination WCD is capable of supporting the instant communication session.

The methods depicted in the call flows and flow charts of FIGS. 2, 3A, 3B, 4, 5A, and 5B each may contain more or fewer steps than shown in the figures. Furthermore, these steps may occur in a different order than they appear in the figures, and these call flows and flow charts may be combined with one another in part or in whole.

IV. Exemplary RAN Component Embodiment

Figure 6:
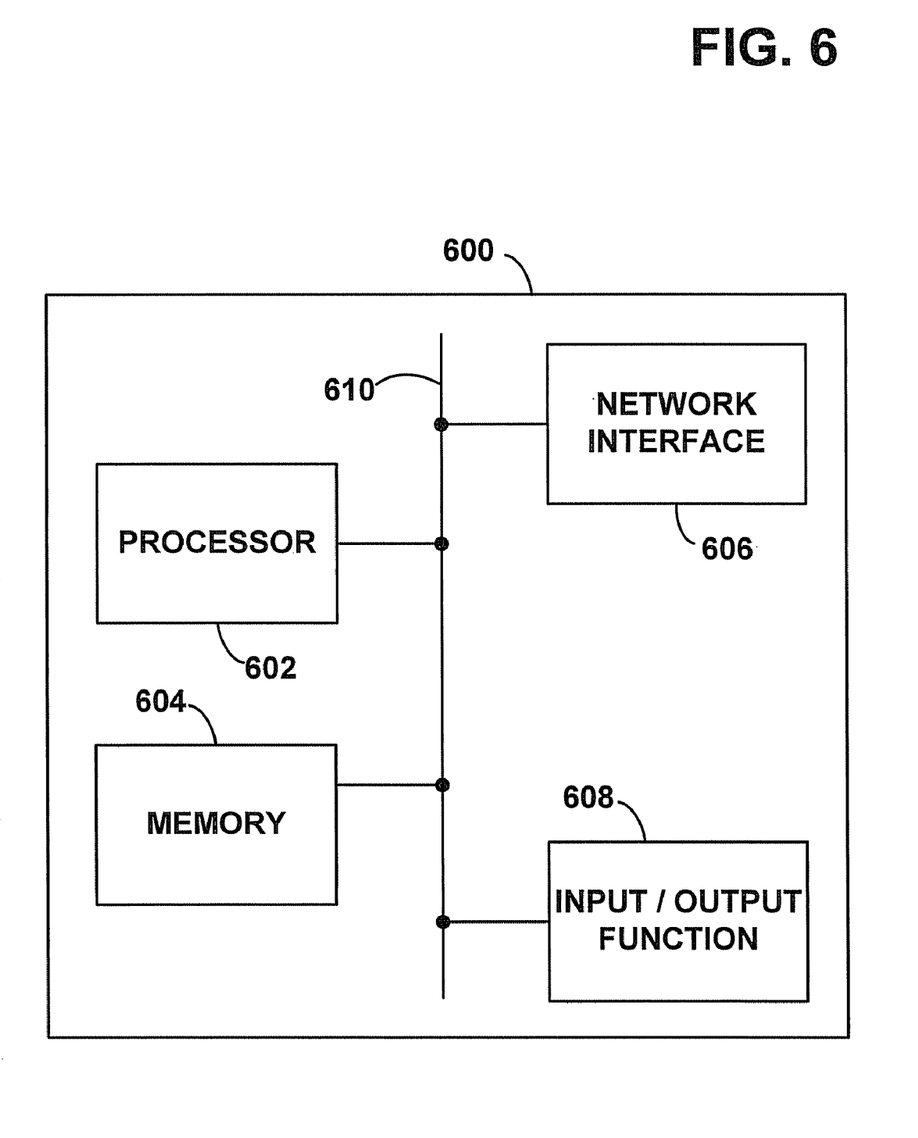
FIG. 6 depicts a block diagram of a RAN component in accordance with an exemplary embodiment.

An exemplary RAN component 600 is depicted as a simplified block diagram in FIG. 6. This RAN component may be an RNC or a BTS, may combine elements of both an RNC and a BTS, or may take on another form. FIG. 6 illustrates some of the functional elements that would likely be found in a RAN component arranged to operate in accordance with the embodiments herein RAN component 600 preferably includes a processor 602, a memory 604, a network interface 606, and an input/output function 608, all of which may be coupled by a system bus 610 or a similar mechanism. Processor 602 preferably includes one or more CPUs, such as one or more general purpose processors and/or one or more dedicated processors (e.g., application specific integrated circuits (ASICs), network processors, or digital signal processors (DSPs), etc.) Memory 604, in turn, may comprise volatile and/or non-volatile memory and can be integrated in whole or in part with processor 602.

Memory 604 preferably holds program instructions executable by processor 602, and data that is manipulated by these instructions to carry out various logic functions described herein. (Alternatively, the logic functions can be defined by hardware, firmware, and/or any combination of hardware, firmware and software.) In particular, memory 604 preferably contains a pre-determined QOS value that is indicative of a low-latency service. Memory 604 may also include a stored profile that indicates capabilities of a destination WCD.

Network interface 606 may take the form of a wireline connection, such as an Ethernet, Token Ring, or T-carrier connection. Network interface 406 may also take the form of a wireless connection, such as IEEE 802.11 (Wifi), BLUE-TOOTH®, or a wide-area wireless connection. However, other forms of physical layer connections and other types of standard or proprietary communication protocols may be used over network interface 606. Furthermore, network interface 606 may comprise multiple physical interfaces.

Input/output function 608 facilitates user interaction with RAN component 600. Input/output function 608 may comprise multiple types of input devices, such as a keyboard, a mouse, a touch screen, and so on. Similarly, input/output function 608 may comprise multiple types of output devices, such as a monitor, printer, or one or more light emitting diodes (LEDs). Additionally or alternatively, RAN component 600 may support remote access from another device, via network interface 606 or via another interface (not shown), such an RS-232 port.

By way of example, memory 604 may comprise program instructions executable by processor 602 to receive, via the packet-switched network, a setup request seeking to establish an instant communication session with the destination WCD, wherein the setup request contains a QOS indication. This QOS indication may take the form of a DSCP. Memory 604 may also comprise program instructions executable by processor 602 to, in response to receiving the setup request, transmit a page request message to the destination WCD.

Additionally, memory 604 may comprise program instructions executable by processor 602 to make a determination of whether the QOS indication contained in the setup request matches the pre-determined QOS value. Furthermore, memory 604 may comprise program instructions executable by processor 602 to, if the determination is that the QOS indication contained in the setup request matches the pre-determined QOS value, (1) assign a traffic channel for the instant communication session to the destination WCD, (2) assign at least one QOS resource for the instant communication session, and (3) thereafter receive a connection request message from the destination WCD, wherein the connection request message is a reply to the page request message. The assigned QOS resource(s) may include reservation flows for in-session signaling and media for the instant communication session. These reservation flows may be formatted according to RSVP, or another protocol.

The program instructions executable by processor 602 to assign at least one QOS resource for the instant communication session may further include program instructions executable by processor 602 to (a) read the stored profile associated with the destination WCD, (b) determine that the stored profile indicates that the destination WCD is capable of supporting the instant communication session, (c) associate a QOS resource with the instant communication session, and (d) transmit an indication of the assigned traffic channel and the QOS resource to the destination WCD. Memory 604 may also comprise program instructions executable by processor 602 to transmit an indication of the at least one assigned QOS resource for the instant communication session to a PDSN that serves the destination WCD.

Yet further, memory 604 may comprise program instructions executable by processor 602 to, if the determination is that the QOS indication contained in the setup request does not match the pre-determined QOS value, (1) receive the connection request message from the destination WCD, and (2) thereafter assign the traffic channel for the instant communication session to the destination WCD.

Moreover memory 604 may comprise program instructions executable by processor 602 to transmit the setup request to the destination WCD on the assigned traffic channel.

V. Conclusion

Exemplary embodiments have been described above. Those skilled in the art will understand, however, that changes and modifications may be made to these embodiments without departing from the true scope and spirit of the invention, which is defined by the claims.

What is claimed is:

1. A method for a radio access network (RAN) to facilitate establishment of an instant communication session for a destination wireless communication device (WCD), wherein the RAN is communicatively coupled to a packet-switched network, and wherein the RAN provides a wireless coverage area that serves the destination WCD, the method comprising the following functions performed by the RAN:

receiving a profile from the destination WCD, wherein the profile indicates that the destination WCD is capable of supporting the instant communication session;

storing the received profile;

after storing the profile, receiving an instant communication session setup message via the packet-switched network, wherein the instant communication session setup message contains a quality of service (QOS) indication;

in response to receiving the instant communication session setup message, making a determination whether a condition is met, wherein the condition comprises (1) the QOS indication containing a pre-determined QOS value, and (2) the destination WCD being capable of supporting the instant communication session;

if the determination is that the condition is met, then (a) transmitting a page request message to the destination WCD, (b) pre-allocating at least one QOS resource for the instant communication session, (c) transmitting to the destination WCD an indication of the at least one QOS resource pre-allocated for the instant communication session, and (d) thereafter receiving a connection request message from the destination WCD, wherein the connection request message is a reply to the page request message; and if the determination is that the condition is not met, then (a) transmitting the page request message to the destination WCD, and (b) receiving the connection request message from the destination WCD without having previously performed QOS resource pre-allocation for the instant communication session.

2. The method of claim 1, further comprising:
if the determination is that the condition is met, then transmitting the instant communication session setup message to the destination WCD.

3. The method of claim 1, wherein the QOS indication is a differentiated services code point (DSCP) marking, and wherein the pre-determined QOS value represents a low-latency service.

4. The method of claim 1, wherein making the determination whether the destination WCD is capable of supporting the instant communication session comprises:
reading the stored profile; and
determining that the stored profile indicates that the destination WCD is capable of supporting the instant communication session.

5. The method of claim 1, wherein pre-allocating the at least one QOS resource for the instant communication session comprises:
assigning a traffic channel to the destination WCD; and
assigning the at least one QOS resource for the instant communication session to the destination WCD.

6. The method of claim 5 wherein transmitting to the destination WCD the indication of the at least one QOS resource pre-allocated for the instant communication session comprises transmitting an indication of the assigned traffic channel and the at least one assigned QOS resource.

7. The method of claim 5, wherein the at least one assigned QOS resource comprises reservation flows for in-session signaling and media.

8. A method for a radio access network (RAN) to facilitate establishment of an instant communication session for a destination wireless communication device (WCD), wherein the RAN is communicatively coupled to a packet-switched network, wherein the RAN provides a wireless coverage area that serves the destination WCD, and wherein the RAN stores a pre-determined QOS value indicative of low-latency service, the method comprising the following functions performed by the RAN:
receiving, via the packet-switched network, a setup request seeking to establish an instant communication session with the destination WCD, wherein the setup request contains a quality of service (QOS) indication;
in response to receiving the setup request, transmitting a page request message to the destination WCD;
making a determination of whether the QOS indication contained in the setup request matches the pre-determined QOS value;
if the determination is that the QOS indication contained in the setup request matches the pre-determined QOS value, (1) assigning a traffic channel for the instant communication session to the destination WCD, (2) assigning at least one QOS resource for the instant communication session, and (3) thereafter receiving a connection request message from the destination WCD, wherein the connection request message is a reply to the page request message;
if the determination is that the QOS indication contained in the setup request does not match the pre-determined QOS value, (1) receiving the connection request message from the destination WCD, and (2) thereafter assigning the traffic channel for the instant communication session to the destination WCD; and
transmitting the setup request to the destination WCD on the assigned traffic channel.

9. The method of claim 8, further comprising, prior to receiving the instant communication session setup message:
receiving a profile from the destination WCD, wherein the profile indicates that the destination WCD is capable of supporting the instant communication session;
storing the received profile; and
wherein assigning the at least one QOS resource comprises (1) reading the stored profile, and (2) determining that the stored profile indicates that the destination WCD is capable of supporting the instant communication session.

10. The method of claim 8, wherein assigning the traffic channel comprises:
assigning a forward traffic channel to the destination WCD, wherein transmitting the setup request to the destination WCD on the assigned traffic channel comprises transmitting the setup request on the forward traffic channel.

11. The method of claim 8, wherein assigning at least one QOS resource for the instant communication session comprises (1) associating a QOS resource with the instant communication session, and (2) transmitting an indication of the assigned traffic channel and the QOS resource to the destination WCD.

12. The method of claim 8, wherein the QOS indication is a differentiated services code point (DSCP) marking.

13. The method of claim 8, wherein the at least one QOS resource comprises reservation flows for in-call signaling and media.

14. A radio access network (RAN) coupled to a packet-switched network and providing a wireless coverage area that serves a destination wireless communication device (WCD), the RAN comprising:
a processor;
a memory;
a pre-determined QOS value stored in the memory, wherein the pre-determined QOS value is indicative of a low-latency service;
program instructions stored in the memory and executable by the processor to receive, via the packet-switched network, a setup request seeking to establish an instant communication session with the destination WCD, wherein the setup request contains a quality of service (QOS) indication;
program instructions stored in the memory and executable by the processor to, in response to receiving the setup request, transmit a page request message to the destination WCD;
program instructions stored in the memory and executable by the processor to make a determination of whether the QOS indication contained in the setup request matches the pre-determined QOS value;
program instructions stored in the memory and executable by the processor to, if the determination is that the QOS indication contained in the setup request matches the pre-determined QOS value, (1) assign a traffic channel for the instant communication session to the destination WCD, (2) assign at least one QOS resource for the instant communication session, and (3) thereafter receive a connection request message from the destination WCD, wherein the connection request message is a reply to the page request message;

program instructions stored in the memory and executable by the processor to, if the determination is that the QOS indication contained in the setup request does not match the pre-determined QOS value, (1) receive the connection request message from the destination WCD, and (2) thereafter assign the traffic channel for the instant communication session to the destination WCD; and program instructions stored in the memory and executable by the processor to transmit the setup request to the destination WCD on the assigned traffic channel.

15. The RAN of claim 14, wherein the QOS indication is a differentiated services code point (DSCP) marking.

16. The RAN of claim 14, wherein the at least one assign QOS resource comprises reservation flows for in-call signaling and media.

17. The RAN of claim 14, further comprising:
 a radio network controller (RNC) communicatively coupled to the packet-switched network;
 a base transceiver station (BTS) communicatively coupled to the RNC and providing the wireless coverage area that serves the destination WCD; and
 a profile, stored in the BTS, indicating that the WCD is capable of supporting the instant communication session.

18. The RAN of claim 17, wherein the program instructions stored in the memory and executable by the processor to assign at least one QOS resource for the instant communication session further comprise:
 program instructions stored in the memory and executable by the processor to read the stored profile;
 program instructions stored in the memory and executable by the processor to determine that the stored profile indicates that the WCD is capable of supporting the instant communication session; and
 program instructions stored in the memory and executable by the processor to (1) associate a QOS resource with the instant communication session, and (2) transmit an indication of the assigned traffic channel and the QOS resource to the destination WCD.

19. The RAN of claim 14, further comprising:
 a packet data serving node (PDSN), wherein the PDSN maintains a point to point protocol (PPP) session with the destination WCD; and
 program instructions stored in the memory and executable by the processor to transmit an indication of the at least one assigned QOS resource for the instant communication session to the PDSN.

20. The RAN of claim 19, wherein the at least one assigned QOS resource comprises reservation flows for in-session signaling and media.

* * * * *